(12) United States Patent
Yang et al.

(10) Patent No.: US 12,368,556 B2
(45) Date of Patent: Jul. 22, 2025

(54) SIMULTANEOUS PUCCH AND PUSCH TRANSMISSIONS OVER DIFFERENT COMPONENT CARRIERS FOR NEW RADIO

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,447

(22) PCT Filed: Apr. 6, 2021

(86) PCT No.: PCT/CN2021/085668
§ 371 (c)(1),
(2) Date: Apr. 1, 2022

(87) PCT Pub. No.: WO2022/213266
PCT Pub. Date: Oct. 13, 2022

(65) Prior Publication Data
US 2024/0048319 A1    Feb. 8, 2024

(51) Int. Cl.
*H04L 5/00* (2006.01)
*H04W 72/1268* (2023.01)
*H04W 72/21* (2023.01)

(52) U.S. Cl.
CPC ....... *H04L 5/0051* (2013.01); *H04W 72/1268* (2013.01); *H04W 72/21* (2023.01)

(58) Field of Classification Search
CPC .. H04L 5/0051; H04W 72/21; H04W 72/1268
See application file for complete search history.

(56) References Cited

U.S. PATENT DOCUMENTS

| 2019/0166615 A1 | 5/2019 | Nimbalker et al. |
| 2019/0296877 A1 | 9/2019 | Zhang et al. |
| (Continued) | | |

FOREIGN PATENT DOCUMENTS

| CN | 109565429 | 4/2019 |
| EP | 3396887 | 10/2018 |
| (Continued) | | |

OTHER PUBLICATIONS

Huawei et al., "Remaining issues on PTRS"; 3GPP TSG RAN WG1 Meeting #92. R1-1801459, Feb. 16, 2018, 5 sheets.

*Primary Examiner* — Elton Williams
(74) *Attorney, Agent, or Firm* — Fay Kaplun & Marcin, LLP

(57) ABSTRACT

A user equipment (UE) is configured to received phase tracking-reference signals (PT-RS). The UE receives configuration information associated with inserting phase tracking-reference signals (PT-RS) into a physical uplink control channel (PUCCH) signal, generates a first signal that is to be transmitted over the PUCCH and is configured to include one or more PT-RS and transmits the first signal over the PUCCH. The UE may also generate a second signal that is to be transmitted over the PUSCH and is configured to include one or more PT-RS, wherein the configuration information further comprises configuration information associated with inserting PT-RS into a physical uplink control (PUSCH) signal and transmit the second signal over (Continued)

the PUSCH, wherein the PUCCH and PUSCH transmissions are performed simultaneously over different component carriers (CCs).

20 Claims, 12 Drawing Sheets

(56) References Cited

U.S. PATENT DOCUMENTS

| | | |
|---|---|---|
| 2021/0029772 A1* | 1/2021 | Islam .................... H04L 1/1896 |
| 2021/0044402 A1* | 2/2021 | Gao ....................... H04L 5/0048 |
| 2021/0045071 A1 | 2/2021 | Maki et al. |
| 2021/0105122 A1 | 4/2021 | Xiong et al. |

FOREIGN PATENT DOCUMENTS

| | | | |
|---|---|---|---|
| WO | 2020/261402 | 12/2020 | |
| WO | WO-2020261402 A1 * | 12/2020 | |
| WO | WO-2022080613 A1 * | 4/2022 | ........... H04L 1/0025 |

* cited by examiner

ASN.1 500

```
PF2-PTRS-UplinkConfig ::= SEQUENCE {
    frequencyDensity SEQUENCE (SIZE (2)) OF INTEGER (1..16) OPTIONAL, -- Need S
    resourceElementOffset ENUMERATED {offset01, offset10, offset11 } OPTIONAL, -- Need S
    ptrs-Power ENUMERATED {p00, p01, p10, p11}
}
```

Fig. 5

ASN.1 800 ↗

PF3-PTRS-UplinkConfig ::= SEQUENCE {
    sampleDensity SEQUENCE (SIZE (5)) OF INTEGER (1..276),
    ...
}

SIMULTANEOUS PUCCH AND PUSCH TRANSMISSIONS OVER DIFFERENT COMPONENT CARRIERS FOR NEW RADIO

BACKGROUND

A network may support the simultaneous physical uplink control channel (PUCCH) and physical uplink shared channel (PUSCH) transmissions over different component carriers (CCs). This capability may provide various benefits on the user equipment (UE) side and the network side. For example, this capability may provide the UE with an opportunity to send uplink control information (UCI) that may otherwise be dropped due to the collision between the PUCCH and PUSCH transmissions, may serve as an alternative to implementing complicated multiplexing rules for UCI and/or improve UCI reliability.

SUMMARY

Some exemplary embodiments are related to a processor of a user equipment (UE) configured to perform operations. The operations include receiving configuration information associated with inserting phase tracking-reference signals (PT-RS) into a physical uplink control channel (PUCCH) signal, generating a first signal that is to be transmitted over the PUCCH and is configured to include one or more PT-RS and transmitting the first signal over the PUCCH.

Other exemplary embodiments are related to a processor of a base station configured to perform operations. The operations include transmitting configuration information to a user equipment (UE), the configuration information associated with the UE inserting phase tracking reference signals (PT-RS) into a physical uplink control channel (PUCCH) signal, receiving a PUCCH signal from the UE, wherein the PUCCH uplink signal includes one or more PT-RS and performing phase tracking based on the one or more PT-RS.

Still further exemplary embodiments are related to a user equipment (UE) having a transceiver configured to communicate with a base station and a processor communicatively coupled to the transceiver and configured to perform operations. The operations include receiving configuration information associated with inserting phase tracking-reference signals (PT-RS) into a physical uplink control channel (PUCCH) signal, generating a first signal that is to be transmitted over the PUCCH and is configured to include one or more PT-RS and transmitting the first signal over the PUCCH.

Additional exemplary embodiments are related to a base station having a transceiver configured to communicate with a user equipment (UE) and a processor communicatively coupled to the transceiver and configured to perform operations. The operations include transmitting configuration information to the UE, the configuration information associated with the UE inserting phase tracking reference signals (PT-RS) into a physical uplink control channel (PUCCH) signal, receiving a PUCCH signal from the UE, wherein the PUCCH uplink signal includes one or more PT-RS and performing phase tracking based on the one or more PT-RS.

BRIEF DESCRIPTION OF THE DRAWINGS

FIG. 5 shows an example of an abstract syntax notation one (ASN.1) for implementing phase tracking-reference signal (PT-RS) for PUCCH format 2 according to various exemplary embodiments.

FIG. 8 shows an example of an abstract syntax notation one (ASN.1) for implementing PT-RS for PUCCH format 3 according to various exemplary embodiments.

FIG. 11 shows an example of a resource grid that includes block wise spreading for PUCCH format 4 according to various exemplary embodiments.

DETAILED DESCRIPTION

Figure 1:
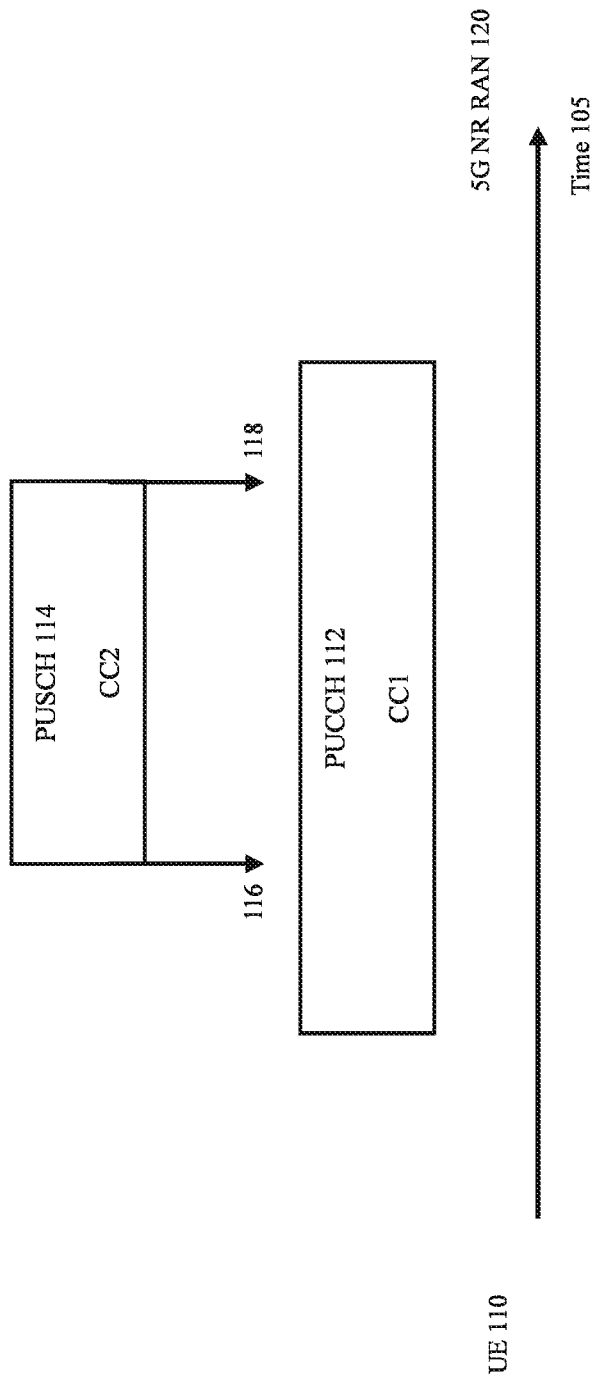
FIG. 1 shows an example of simultaneous physical uplink control channel (PUCCH) and physical uplink shared channel (PUSCH) transmissions over different component carriers (CCs).

The exemplary embodiments may be further understood with reference to the following description and the related appended drawings, wherein like elements are provided with the same reference numerals. The exemplary embodiments include techniques that are configured to enable a user equipment (UE) to perform simultaneous physical uplink control channel (PUCCH) and physical uplink shared channel (PUSCH) transmissions over different component carriers (CCs) in a fifth generation (5G) new radio (NR) network.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a 5G NR network that supports simultaneous PUCCH and PUSCH transmissions over different CCs. The PUCCH is an uplink channel that may carry uplink control information (UCI). The term UCI may encompass various types of control information. For example, the contents of UCI may include, but is not limited to, hybrid automatic repeat request (HARQ) feedback (e.g., acknowledgement (ACK), negative acknowledgement (NACK), etc.), scheduling requests (SRs), channel state information (CSI) or a combination thereof.

The phase discontinuity between overlapping PUCCH and PUSCH transmissions may cause a degradation in performance that makes simultaneous PUCCH and PUSCH transmissions on different CCs impractical under conventional circumstances. In NR, a phase tracking-reference signal (PT-RS) may be included in a PUSCH transmission to provide a base station with a resource that may be used to account for phase noise, phase jumps and other types of phase discontinuities. As will be described in more detail below, the exemplary embodiments relate to introducing PT-RSs for PUCCH. In one aspect, this feature may enable simultaneous PUCCH and PUSCH transmissions over different CCs.

It has been identified that support of PT-RS for the PUSCH at all modulation and coding scheme (MCS) levels and all durations is possible using currently available radio resource control (RRC) configurations. Those skilled in the art will understand that under conventional circumstances, PT-RS is not typically inserted in the PUSCH to enable simultaneous PUCCH and PUSCH transmissions over different CCs. Therefore, some of the exemplary embodiments may reference utilizing PT-RS for PUSCH transmissions in an unconventional manner. In these examples, it is assumed that currently implemented RRC techniques or future implementations of RRC techniques may be utilized to insert PT-RS into the PUSCH. However, the specific RRC configurations used to enable the PUSCH PT-RS described herein are beyond the scope of the exemplary embodiments.

Throughout this description, reference is made to different formats of PUCCH including PUCCH format 2, PUCCH format 3 and PUCCH format 4. Each PUCCH format is associated with various parameters including a number of bits and a length of symbols. Those skilled in the art will understand that each of these PUCCH formats are defined in third generation partnership program (3GPP) Specifications. Generally, the PUCCH formats described herein are to be configured and utilized in the manner in which they are defined in the 3GPP Specifications. However, the exemplary embodiments include techniques for implementing PUCCH PT-RS. Accordingly, the exemplary embodiments are described with regard to conventional PUCCH formats that are configured in an unconventional manner to include PT-RS.

FIG. 1 shows an example of simultaneous PUCCH and PUSCH transmissions over different CCs. The example illustrates an example including overlapping uplink communications between a UE 110 and a 5G NR radio access network (RAN) 120. Specific details regarding the UE 110 and the 5G NR RAN 120 will be provided below with regard to the network arrangement 200 of FIG. 2.

The example includes the time domain 105 and shows the PUCCH 112 on CC1 and the PUSCH 114 on CC2. In the example, the duration of the PUCCH 112 is longer than the duration of the PUSCH 114. However, in other configurations, the duration of the PUSCH may be longer than the duration of the PUCCH or the durations of the PUSCH and the PUCCH may be approximately the same size. The example is not intended to limit the exemplary embodiments in any way and is merely provided to illustrate a general example in which PUCCH and PUSCH transmissions occur at the same time over different CCs.

When PUCCH and PUSCH transmissions overlap in time there may be a phase jump. From a network perspective, phase discontinuity may cause demodulation issues that may prevent the successful reception of the PUCCH and/or the PUSCH. The example also illustrates potential phase jumps between the PUCCH 112 and the PUSCH 114. In the example, the arrow 116 may represent a 90 degree phase difference between the PUCCH 112 and the PUSCH 114 and the arrow 118 may represent a −90 degree phase difference between the PUCCH 112 and the PUSCH 114. This phase discontinuity may cause demodulation issues that prevent the successful reception of the PUCCH 112. As will be described in more detail below, some of the exemplary mechanisms described herein are configured to account for phase discontinuity and thus, may mitigate demodulation issues that may arise within the context of simultaneous PUCCH and PUSCH transmissions over different CCs.

Although the exemplary embodiments are described with regard to enabling simultaneous PUCCH and PUSCH transmissions on different CCs, the exemplary concepts described herein may also be utilized for enabling simultaneous transmission of the PUCCH and a further uplink signal/channel on different CCs. To provide an example, the exemplary embodiments may be utilized in a scenario where PUCCH is provided on a first CC and sounding reference signal (SRS) or physical random access channel (PRACH) is provided on a second CC. In this example the SRS or PRACH may be used for beam management, codebook configurations, non-codebook configurations, antenna switching, positioning, etc. Those skilled in the art will understand how the exemplary concepts described herein with regard to simultaneous PUCCH and PUSCH transmission may be utilized to enable the simultaneous transmission of the PUCCH and another uplink signal/channel on a different CC.

Figure 2:
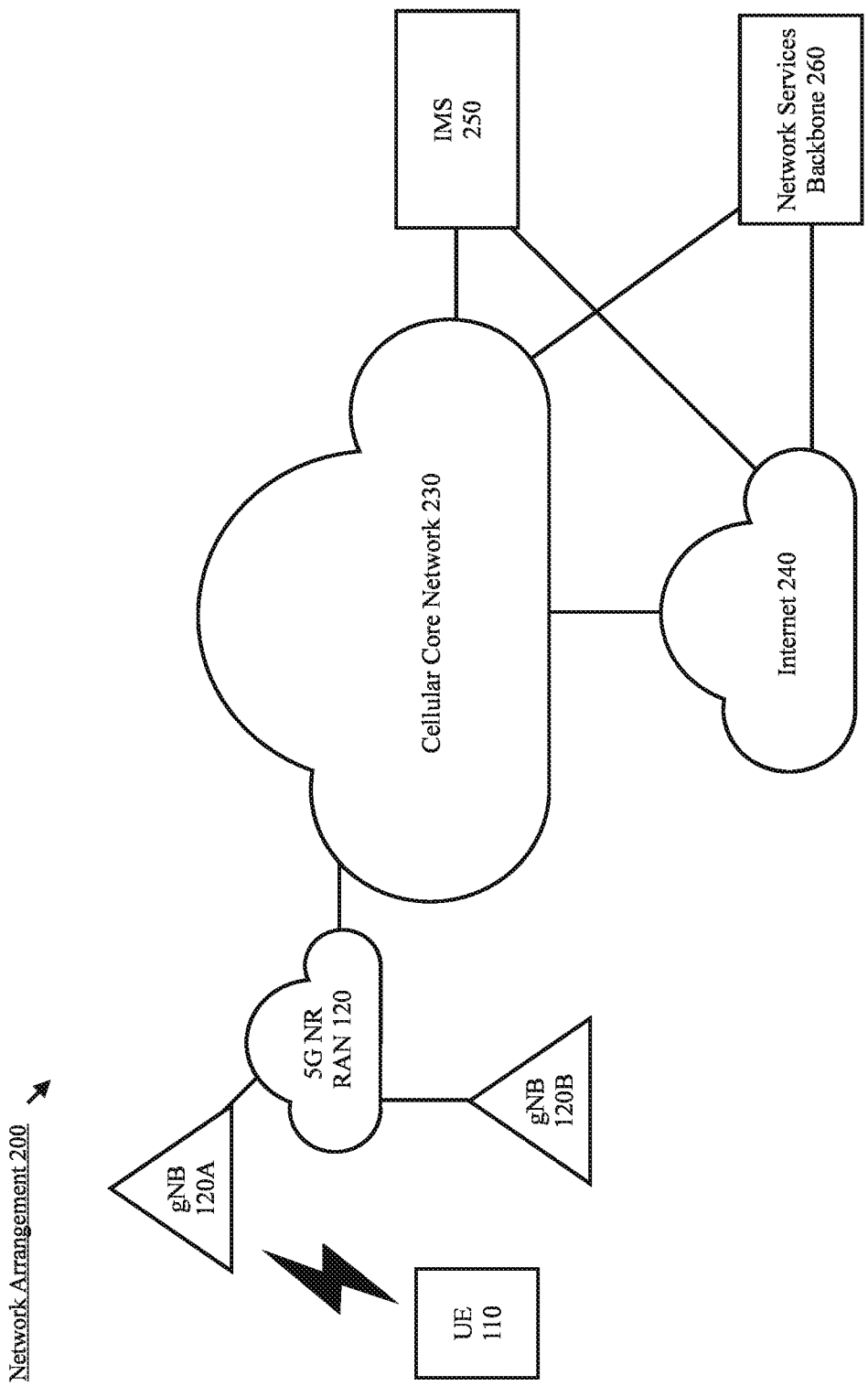
FIG. 2 shows an exemplary network arrangement according to various exemplary embodiments.

FIG. 2 shows an exemplary network arrangement 200 according to various exemplary embodiments. The exemplary network arrangement 200 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 200, the network with which the UE 110 may wirelessly communicate is a 5G NR radio access network (RAN) 120. However, the UE 110 may also communicate with other types of networks (e.g., 5G cloud RAN, a next generation PAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR PAN 120. Therefore, the UE 110 may have a 5G NR chipset to communicate with the 5G NR RAN 120.

The 5G NR PAN 120 may be a portion of a cellular network that may be deployed by a network carrier (e.g., Verizon, AT&T, T-Mobile, etc.). The 5G NR RAN 120 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Some of the exemplary embodiments relate to the UE 110 performing simultaneous PUCCH and PUSCH transmissions over different CCs. This type of scenario may relate to concepts such as dual connectivity (DC) and/or carrier aggregation (CA). Thus, the UE 110 may be configured to communicate with one or more base stations. In the example of the network arrangement 200, the UE 110 may communicate with the gNB 120A and gNB 120B. In some scenarios, there may be a first CC between the UE 110 and the gNB 120A and a second CC between the UE 110 and the gNB 120B. In other scenarios, there may be multiple CCs between the UE 110 and a single gNB or base station. However, any reference to a particular configuration of base stations and CCs is merely provided for illustrative purposes. The exemplary embodiments may apply to any appropriate scenario in which simultaneous PUCCH and PUSCH transmissions over different CCs may be utilized.

The gNBs 120A, 120B may include one or more communication interfaces to exchange data and/or information with camped UEs, the 5G NR PAN 120, the cellular core network 230, the internet 240, etc. Further, the gNBs 120A, 120B may include a processor configured to perform various operations. For example, the processor may be configured to perform operations related to configuring PT-RS for simultaneous PUCCH and PUSCH communications and receiving PT-RS over the PUCCH and/or PUSCH from the UE 110. However, reference to a processor is merely for illustrative purposes. The operations of the gNBs 120A, 120B may also be represented as a separate incorporated component of the base station or may be a modular component coupled to the node, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Any suitable association procedure may be performed for the UE 110 to connect to the 5G NR PAN 120. For example, as discussed above, the 5G NR PAN 120 may be associated with a particular cellular provider where the UE 110 and/or the user thereof has a contract and credential information (e.g., stored on a SIM card). Upon detecting the presence of the 5G NR PAN 120, the UE 110 may transmit the corresponding credential information to associate with the 5G NR PAN 120. More specifically, the UE 110 may associate with a specific cell or base station (e.g., gNB 120A, 120B). As mentioned above, the use of the 5G NR PAN 120 is for illustrative purposes and any appropriate type of PAN may be used.

In addition to the 5G NR RAN 120, the network arrangement 200 also includes a cellular core network 230, the Internet 240, an IP Multimedia Subsystem (IMS) 250, and a network services backbone 260. The cellular core network 230 may be considered to be the interconnected set of components that manages the operation and traffic of the cellular network. It may include the EPC and/or the 5GC. The cellular core network 230 also manages the traffic that flows between the cellular network and the Internet 240. The IMS 250 may be generally described as an architecture for delivering multimedia services to the UE 110 using the IP protocol. The IMS 250 may communicate with the cellular core network 130 and the Internet 240 to provide the multimedia services to the UE 110. The network services backbone 260 is in communication either directly or indirectly with the Internet 240 and the cellular core network 130. The network services backbone 260 may be generally described as a set of components (e.g., servers, network storage arrangements, etc.) that implement a suite of services that may be used to extend the functionalities of the UE 110 in communication with the various networks.

Figure 3:
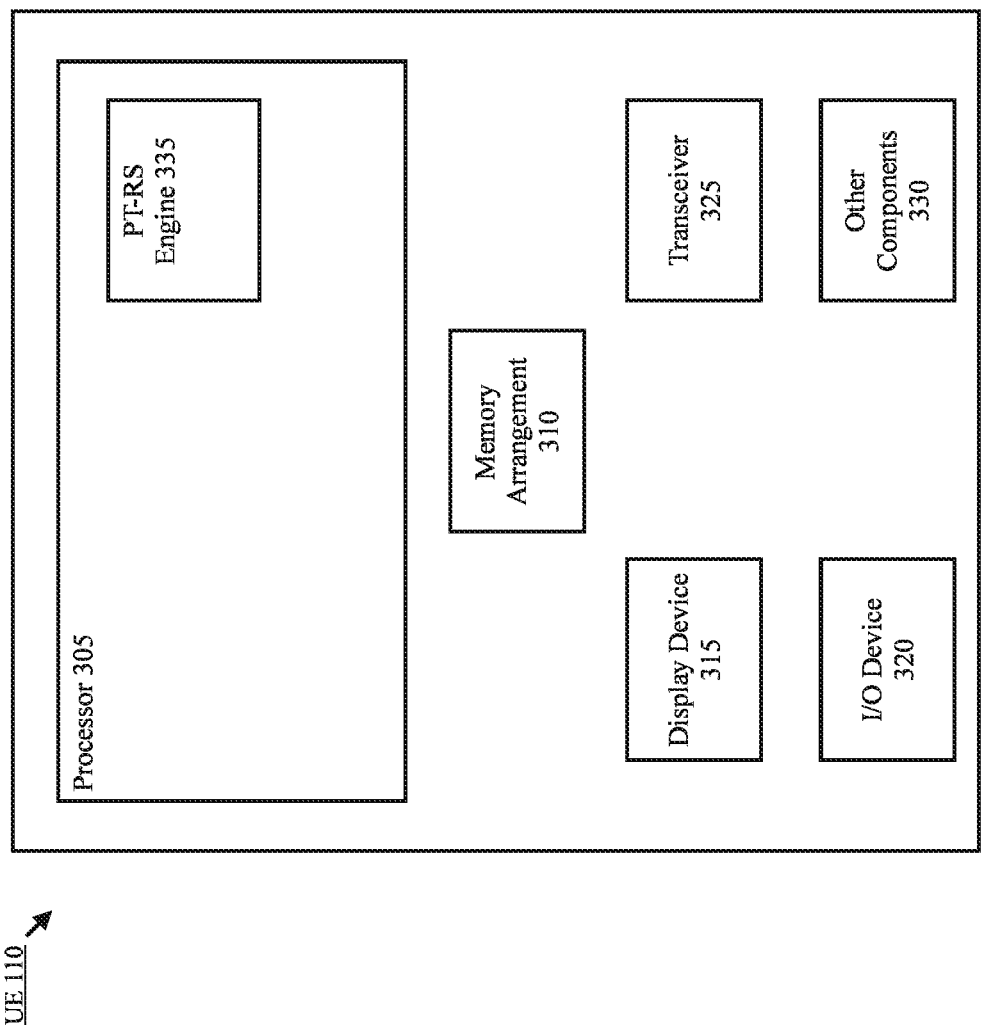
FIG. 3 shows an exemplary UE according to various exemplary embodiments.

FIG. 3 shows an exemplary UE 110 according to various exemplary embodiments. The UE 110 will be described with regard to the network arrangement 200 of FIG. 2. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include an PT-RS engine 335. The PT-RS engine 235 may perform various operations related to inserting PT-RS into PUCCH and/or PUSCH transmissions.

The above referenced engine 335 being an application (e.g., a program) executed by the processor 305 is merely provided for illustrative purposes. The functionality associated with the engine 335 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy PAN (not pictured), a WLAN (not pictured), etc. Accordingly, the transceiver 325 may operate on a variety of different frequencies or channels (e.g., set of consecutive frequencies).

Figure 12:
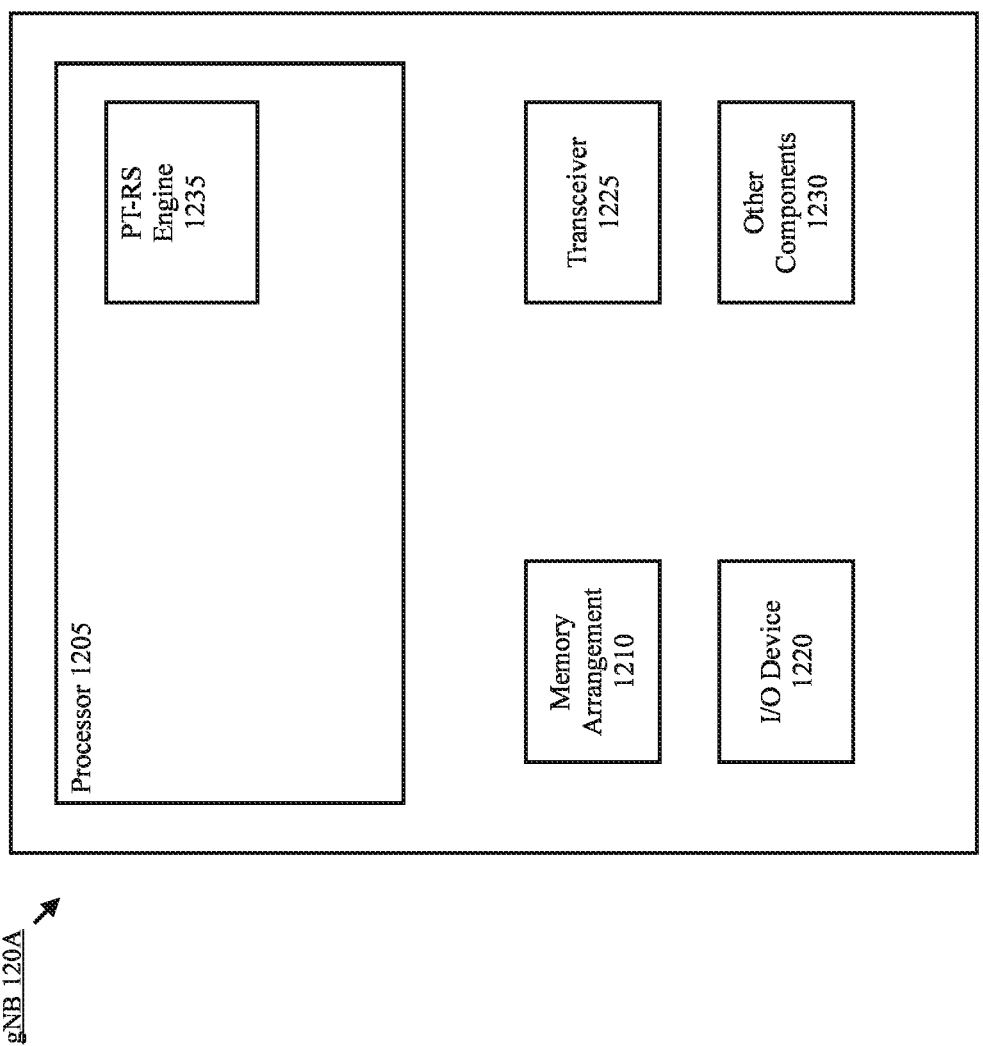
FIG. 12 shows an exemplary base station according to various exemplary embodiments.

FIG. 12 shows an exemplary base station, in this case gNB 120A, according to various exemplary embodiments. The gNB 120A may represent any access node of the 5G NR network through which the UE 110 may establish a connection and manage network operations.

The gNB 120A may include a processor 1205, a memory arrangement 1210, an input/output (I/O) device 1220, a transceiver 1225, and other components 1230. The other components 1230 may include, for example, an audio input device, an audio output device, a battery, a data acquisition device, ports to electrically connect the gNB 120A to other electronic devices, etc.

The processor 1205 may be configured to execute a plurality of engines of the gNB 120A. For example, the engines may include a PT-RS engine 1235. The PT-RS engine 1235 may be configured to perform operations related to configuring PT-RS for simultaneous PUCCH and PUSCH communications and receiving PT-RS over the PUCCH and/or PUSCH from the UE 110.

The above noted engines each being an application (e.g., a program) executed by the processor 1205 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 1205 is split among a plurality of processors (e.g., a baseband processor, an applications processor, etc.). The exemplary embodiments may be implemented in any of these or other configurations of a gNB.

The memory 1210 may be a hardware component configured to store data related to operations performed by the UE 110. The I/O device 1220 may be a hardware component or ports that enable a user to interact with the gNB 120A. The transceiver 1225 may be a hardware component configured to exchange data with the UE 110 and any other UE in the network arrangement 200. The transceiver 1225 may operate on a variety of different frequencies or channels (e.g., set of consecutive frequencies). Therefore, the transceiver 1225 may include one or more components (e.g., radios) to enable the data exchange with the various networks and UEs.

As stated above, the exemplary embodiments relate to enabling simultaneous PUCCH and PUSCH transmissions on different CCs. This feature may provide various benefits to 5G NR communications. For example, this feature may provide the UE 110 with an opportunity to send UCI that may otherwise be dropped due to a collision between PUCCH and PUSCH transmissions, may serve as an alternative to implementing complicated multiplexing rules for UCI and/or improve UCI reliability.

It has been identified that the phase discontinuity between overlapping PUCCH and PUSCH transmissions causes a degradation in performance that makes simultaneous PUCCH and PUSCH transmissions on different CCs impractical under conventional circumstances. In NR, under conventional circumstances, PT-RS may be used for phase tracking and mitigate the negative effects of phase noise. To improve performance for simultaneous PUCCH and PUSCH transmissions on different CCs, it may be beneficial to insert PT-RS into the PUCCH and/or PUSCH transmissions.

In addition to PT-RS, the exemplary embodiments are described with regard to a demodulation reference signal (DMRS). Those skilled in the art will understand that DMRS may be specific to the UE 110 and inserted into a signal to enable a base station to decode the contents of the uplink signal. To provide a general example, the UE 110 may receive one or more information elements (IEs) from a currently camped base station, e.g., the gNB 120A. The IEs may indicate the DMRS configuration for the PUCCH and/or the PUSCH. The UE 110 may then transmit a signal to the gNB 120A that includes DMRS. On the network side, the gNB 120A may monitor for DMRS and if DMRS detection is successful, the gNB 120A may then decode the corresponding information and/or data transmitted over the PUCCH or PUSCH by the UE 110.

Generally, DMRS design considers factors such as delay spread, Doppler shift and/or Doppler spread. However, phase discontinuity is not a consideration in DMRS design. Instead, PT-RS may be used to mitigate the negative effects of phase discontinuity. As will be described in more detail below, some of the exemplary embodiments are described with regard to uplink transmissions that include DMRS and PT-RS.

Single symbol DMRS may be used for PUSCH transmissions and, if PT-RS is present in other symbols that do not include DMRS, the base station may adequately track phase changes. Inserting PT-RS for the PUSCH transmission at all MCS levels and all durations may be possible using the appropriate RRC configurations. Thus, while some of the exemplary embodiments may reference the unconventional concept of PT-RS being inserted in PUSCH transmissions to enable simultaneous PUCCH and PUSCH transmissions over different CCs, the specific manner in which the PUSCH is configured to incorporate PT-RS is beyond the scope of the exemplary embodiments.

Figure 4:
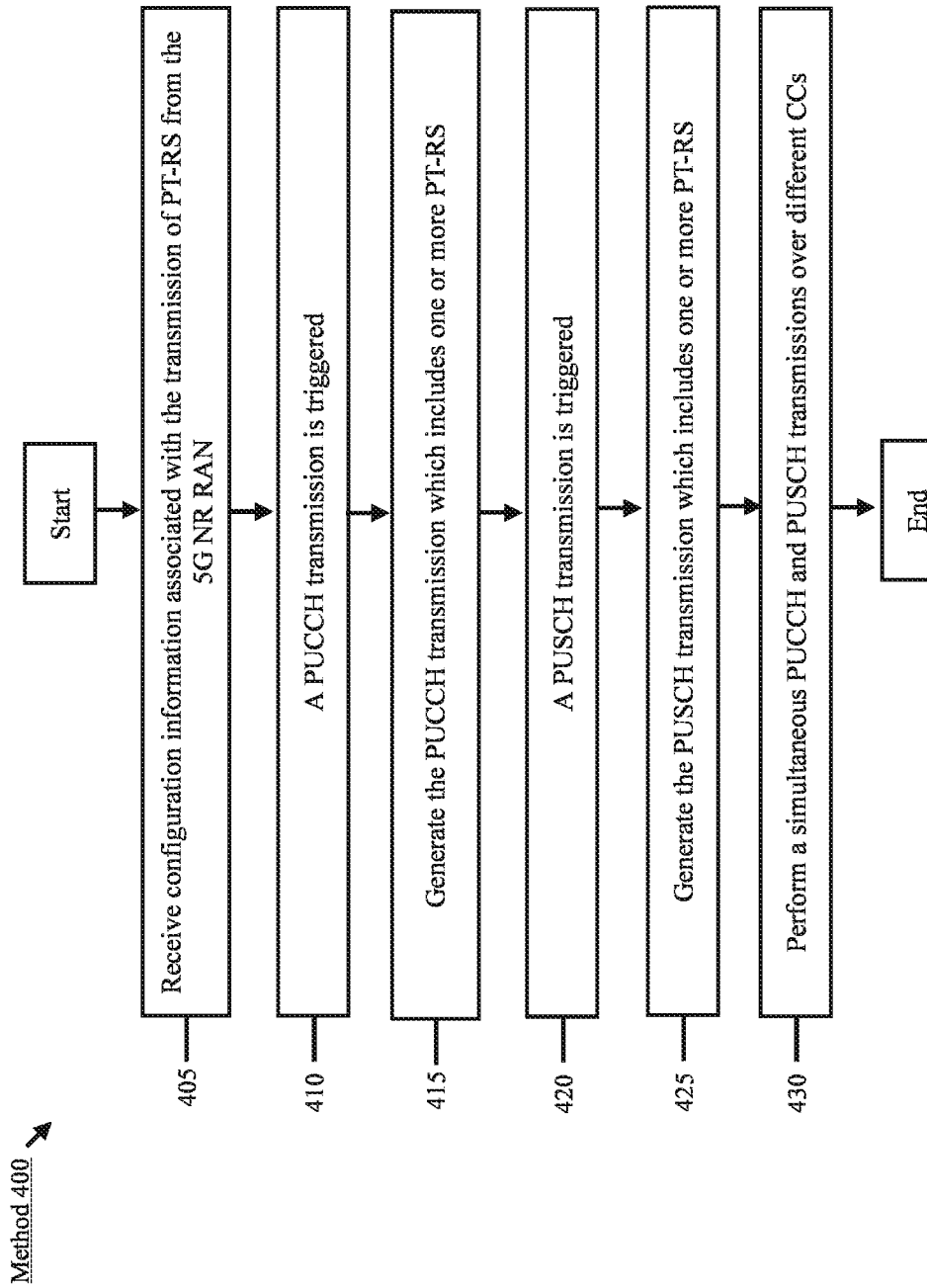
FIG. 4 shows a method for simultaneous physical uplink control channel (PUCCH) and physical uplink shared channel (PUSCH) transmissions on different component carriers (CCs) according to various exemplary embodiments.

FIG. 4 shows a method 400 for simultaneous PUCCH and PUSCH transmissions on different CCs according to various exemplary embodiments. The method 400 is provided as a general overview of the types of operations that may be performed by the UE 110 to enable this capability and is not intended to limit the exemplary embodiments in any way. Specific details regarding implementing PT-RS for PUCCH format 2, PUCCH format 3 and PUCCH 4 will be provided below with regard to FIGS. 5-11.

Initially, consider a scenario in which the UE 110 is configured with multiple CCs by the 5G NR PAN 120. For example, the network may configure a first CC between the UE 110 and the gNB 120A and a second CC between the UE 110 and the gNB 120B. Both the UE 110 and the 5G NR PAN 120 support the simultaneous transmission of PUCCH and PUSCH over different CCs.

In 405, the UE 110 may receive configuration information associated with the transmission of PT-RS from the 5G NR PAN 120. For example, the UE 110 may receive one or more information elements (IEs). The one or more IEs may include configuration information for PUSCH PT-RS and/or PUCCH PT-RS. To provide an example, the one or more IEs may include configuration information such as, but not limited to, parameters related to PT-RS frequency density, parameters related to PT-RS time density, a resource element offset, a transmission power parameter, etc.

In 410, the UE 110 is triggered to perform a PUCCH transmission. The PUCCH transmission may include UCI such as, but not limited to, HARQ feedback, SRs, CSI or a combination thereof. Those skilled in the art will understand that there is a wide variety of different parameters and/or conditions that may provide the basis for the UE 110 to determine the type of UCI that is to be transmitted over the PUCCH and timing of the PUCCH transmission. As will be explained in more detail below, the PUCCH transmission may utilize a specific PUCCH format, e.g., PUCCH format 2, PUCCH format 3, PUCCH format 4, etc. The UE 110 may select the PUCCH format for the PUCCH transmission based on any appropriate factors.

In 415, the UE 110 generates the PUCCH transmission which includes one or more PT-RS. The PT-RS configuration for the PUCCH transmission may be determined by the UE 110 based on the configuration information received in 405. For example, the UE 110 (e.g., processor 305) may generate a baseband sequence for the PUCCH transmissions based on the configuration information which may include inserting one or more PT-RS.

In 420, the UE 110 is triggered to perform a PUSCH transmission. The PUSCH may include data and/or UCI. Those skilled in the art will understand that there is a wide variety of different parameters and/or conditions that may provide the basis for the UE 110 to determine the bits of data that are to be included in the PUSCH transmission, the type of UCI (if any) that is to be transmitted over the PUSCH and timing of the PUSCH transmission.

In 425, the UE 110 generates the PUSCH transmission which includes one or more PT-RS. The PT-RS configuration for the PUSCH transmission may be determined by the UE 110 based on the configuration information received in 405. For example, the UE 110 (e.g., processor 305) may generate a baseband sequence for the PUSCH transmissions based on the configuration information which may include inserting one or more PT-RS.

In 430, the UE 110 performs a simultaneous PUCCH and PUSCH transmission over different CCs. For example, the UE 110 may transmit UCI to the gNB 120A over the PUCCH on a first CC and data (with or without UCI) to the gNB 120B over the PUSCH on a second CC. As indicated above, the PUCCH and the PUSCH are both configured to include PT-RS which may mitigate the negative effect of the phase discontinuity between these overlapping transmissions. However, in some scenario, the network may configure the UE 110 with PT-RS for PUCCH while not utilizing PT-RS for the PUSCH (e.g., SRS, PRACH, etc.). Since a short PUCCH (e.g., a single OFDM symbol) is less likely to suffer from phase continuity, in some embodiments, the network and/or the UE 110 may decide not to include PT-RS in the PUCCH if the duration of the PUCCH is less than a threshold value for a given PUCCH format, e.g., 4 symbol threshold for PUCCH format 3, etc.

On the network side, the base stations may process uplink transmission from the UE 110 and monitor for the PT-RS. When the PUCCH duration and the PUSCH duration are misaligned in time, the PT-RS may be used for phase tracking and mitigate the negative effects caused by the phase discontinuity between the overlapping PUCCH and PUSCH transmissions.

In one aspect, the exemplary embodiments include techniques for implementing PT-RS for PUCCH format 2. PUCCH format 2 may occupy one or two symbols, carry up to two bits and span one to sixteen physical resource blocks (PRBs). Exemplary techniques for implementing PT-RS for PUCCH format 2 will be described below with regard to FIGS. 5-7.

FIG. 5 shows an example of an abstract syntax notation one (ASN.1) 500 for implementing PT-RS for PUCCH format 2. The ASN.1 500 illustrates the type of configuration information that may be transmitted by the 5G NR RAN 120 to the UE 110 for inserting PT-RS into PUCCH format 2 transmission. Those skilled in the art will understand that the ASN.1 500 may represent RRC signaling or any other appropriate type of higher layer signaling.

Those skilled in the art will understand that transform precoding is a baseband technique that may be applied when generating an uplink transmission that utilizes discrete Fourier transform-spread-orthogonal frequency division multiplexing (DFT-S-OFDM). Accordingly, in the example described below various aspects related to generating a PUCCH format 2 transmission that includes one or more PT-RS may be performed when transform precoding is not enabled. Since transform precoding is not enabled for PUCCH format 2 PT-RS, the uplink waveform for this transmission may be a cyclic prefix (CP)-OFDM waveform. However, throughout this description, any reference to transform precoding and CP-OFDM is merely provided for illustrative purposes. The exemplary embodiments may utilize any appropriate type of sequence generation technique to enable the exemplary features described herein for PUCCH format 2.

Figure 6:
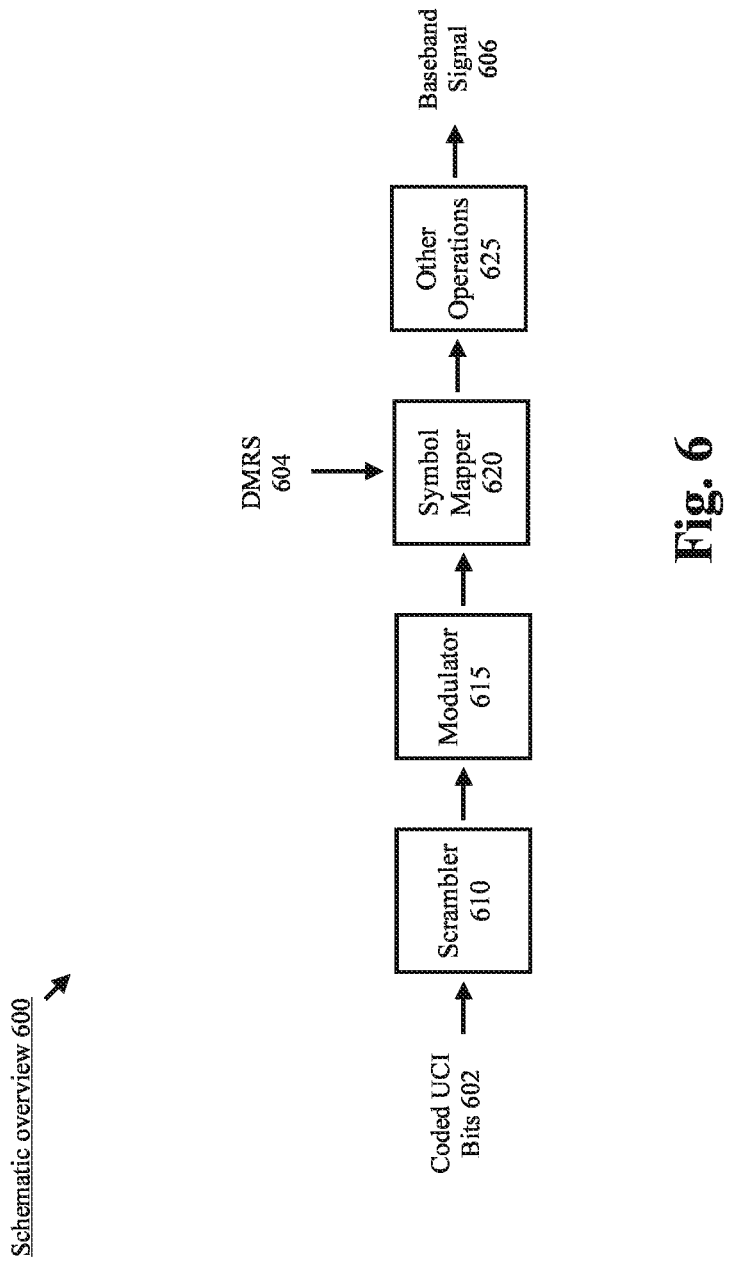
FIG. 6 shows a schematic overview of various baseband operations that may be performed to configure PUCCH format 2 with one or more PT-RS according to various exemplary embodiments.

FIG. 6 shows a schematic overview 600 of various baseband operations that may be performed to configure PUCCH format 2 with one or more PT-RS. The schematic overview 600 is provided as a general overview of some of the operations that may be performed by the UE 110 (e.g., processor 305) when configuring UCI to be transmitted in accordance with PUCCH format 2.

In the schematic overview 600, coded UCI bits 602 are input into a scrambler 610. In some embodiments, if the PUCCH format 2 transmission is configured to occupy two symbols, separate gold sequences may be used to scramble each symbol.

The scrambler 610 may output scrambled UCI which is then provided to the modulator 615. The modulator 615 may be configured to perform quadrature phase shift keying (QPSK) modulation on the coded UCI bits 602. In this example, since transform precoding is not enabled, the coded UCI bits 602 are provided to a symbol mapper 620 without being subjected to operations related to implementing DFT spreading.

In addition, the schematic overview 600 shows that DMRS 604 is also provided to the symbol mapper 620. The symbol mapper 620 may perform operations related to mapping UCI 602, PT-RS and/or DMRS 604 to the resources associated with the PUCCH. Those skilled in the art will understand that the output of the symbol mapper 620 may be subjected to other operations 625 before a baseband signal may be generated. The other operations 625 may include, but are not limited to, inverse fast Fourier transform (IFFT), CP insertion, gain and frequency adjustment, time domain windowing, etc. Subsequently, a baseband signal 606 is generated and ready to be transmitted.

Returning to the ASN.1 500 of FIG. 5, the frequency density parameter includes one or more integer parameters. In this example, one integer parameter indicates that two PRB number thresholds are to be used by the UE 110 to determine the frequency density of PT-RS for the PUCCH format 2 transmission. However, in an actual deployment scenario, any appropriate number of thresholds may be utilized. The second integer parameter represents PRBs that may be used for the PUCCH format 2 transmission. Since PUCCH format 2 supports one to sixteen PRBs, the integer parameter in the ASN.1 500 is shown to include a value that may be within the range of one to sixteen. In addition, for millimeter waveform systems beyond 52.6 gigahertz (GHz), appropriate adjustment can be made according to the supported PRB numbers for PUCCH format 2.

In some embodiments, if the frequency density parameter is not indicated in RRC signaling, then the UE 110 may configure PT-RS for PUCCH format 2 to occur every (X) PRBs. The value X may be hard encoded into the specifications (e.g., 3GPP specifications) or determined in any other appropriate manner.

If the frequency density parameter is included in RRC signaling, then the UE 110 may determine the frequency density of PT-RS for PUCCH format 2 as referenced above. For example, if the number of PRBs for the PUCCH format 2 is less than a first threshold value, PT-RS may not be included in the PUCCH transmission. If the number of PRBs for the PUCCH format 2 is greater than a first threshold value and lower than a second threshold value, then PT-RS may be inserted every (Y) PRB. If the number of PRBs for the PUCCH format 2 is greater than the first and second threshold value then PT-RS may be inserted every (Z) PRB, where the value of Z is greater than the value of Y. Thus, the PRB parameter may be used to control the signaling overhead of the PT-RS.

The ANS.1 500 also includes a resource offset parameter. The resource offset parameter may be used to control the location of the PT-RS signals. In addition, the ASN.1 500 also includes a power ratio parameter for the PT-RS relative to other symbols of the PUCCH.

In some scenarios, the sub-carrier spacing (SCS) for each CC may be different. For example, the PUCCH may have a SCS of 15 kilohertz (KHz) on a first CC and the PUSCH may have a SCS of 30 KHz. When the SCS are different, it may be beneficial to implement block PT-RS. In one aspect, block PT-RS mitigates the phase noise that may occur due to inter carrier interference. In addition, the different SCS may cause a phase jump to occur within a symbol. By using block PT-RS, the phase jump within a symbol may be tracked. For example, with (X) tones in the block PT-RS, separate estimates over (X) for each tone may be performed.

Figure 7:
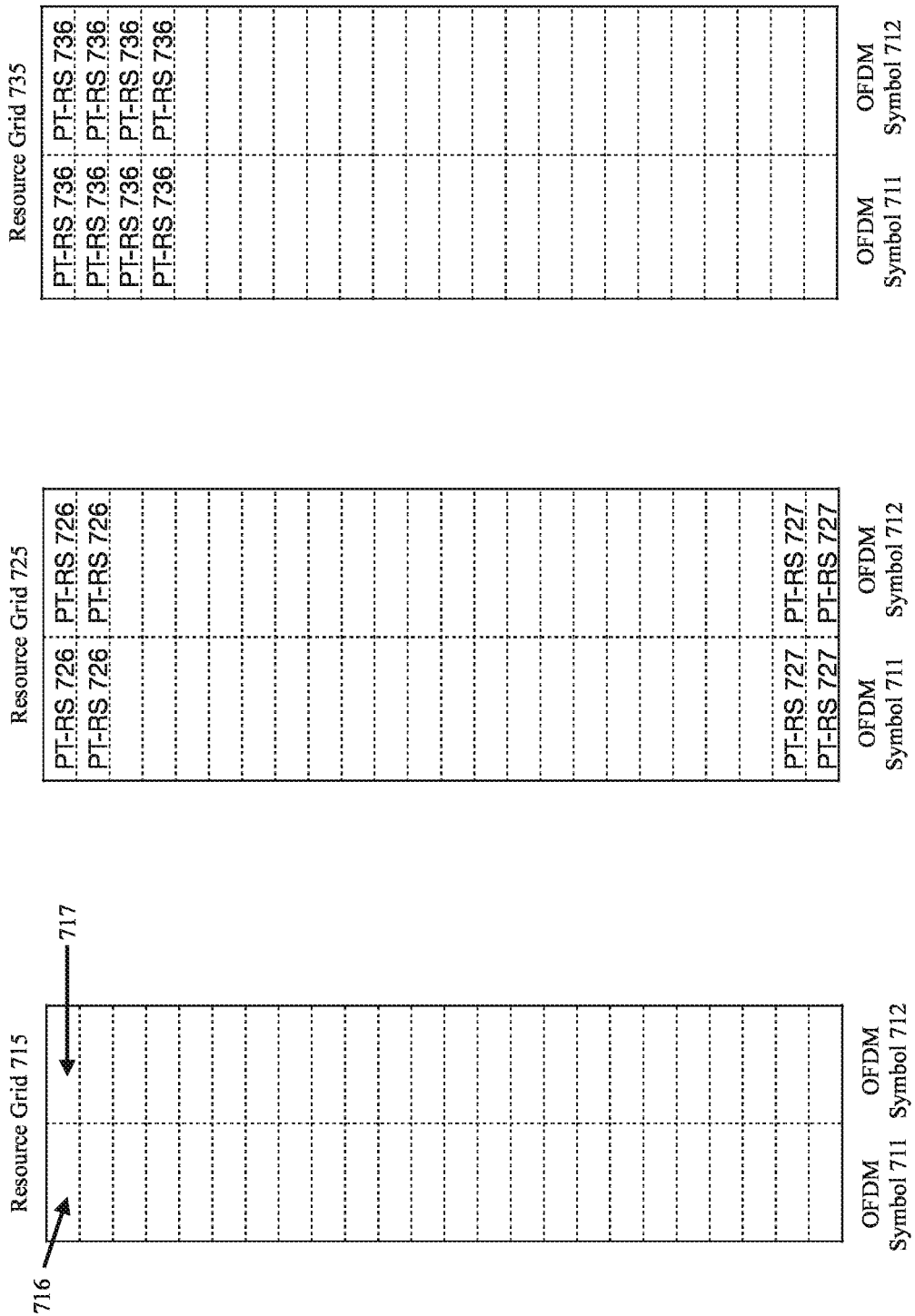
FIG. 7 shows two examples of a resource grid that includes block PT-RS for PUCCH format 2 according to various exemplary embodiments.

FIG. 7 shows two examples of a resource grid that includes block PT-RS for PUCCH format 2. The resource grid 715 represents a PUCCH format 2 that spans two OFDM symbols 711, 712 and includes multiple resource blocks (RBs). As indicated above, when different SCS is used for the PUSCH and the PUCCH, there may be a phase jump within an OFDM symbol. In the resource grid 715, reference points 716, 717 are shown within OFDM symbols 711, 712 to illustrate that a phase jump may occur within an OFDM symbol due to different SCS on the CCs. The resource grid 715 does not include PT-RS.

Block PT-RS for PUCCH format 2 may be parameterized by a number of blocks, a number of tones per block, an offset relative to the first tone in the first block and the lowest tone in the PUSCH and/or any other appropriate parameter. The resource grid 725 shows a first PT-RS block 726 and a second PT-RS block 727 that has been inserted into the PUCCH. In this example, each PT-RS block 726, 727 includes two tones for each OFDM symbol 711, 712. To provide another example, the resource grid 735 shows a PT-RS block 736 that has been inserted into the PUCCH and includes four tones for each OFDM symbol 711, 712.

In another aspect, the exemplary embodiments include techniques for implementing PT-RS for PUCCH format 3. PUCCH format 3 may occupy four to fourteen symbols, carry more than two bits and span one or more PRBs. Exemplary techniques for implementing PT-RS for PUCCH format 3 will be described below with regard to FIGS. 8-9.

FIG. 8 shows an example of an abstract syntax notation one (ASN.1) 800 for implementing PT-RS for PUCCH format 3. The ASN.1 800 illustrates the type of configuration information that may be transmitted by the 5G NR PAN 120 to the UE 110 for inserting PT-RS into PUCCH format 3. Those skilled in the art will understand that the ASN.1 800 may represent RRC signaling or any other appropriate type of higher layer signaling.

As mentioned above, transform precoding is a baseband technique that may be applied when generating an uplink transmission that DFT-S-OFDM. Accordingly, in this example, various aspects related to generating a PUCCH format 3 transmission that includes one or more PT-RS may be performed when transform precoding is enabled. Since transform precoding is enabled for PUCCH format 3 PT-RS, the uplink waveform for this transmission may be a DFT-S-OFDM waveform. However, throughout this description, any reference to transform precoding and DFT-S-OFDM is merely provided for illustrative purposes. The exemplary embodiments may utilize any appropriate type of sequence generation technique to enable the exemplary features described herein for PUCCH format 3.

Figure 9:
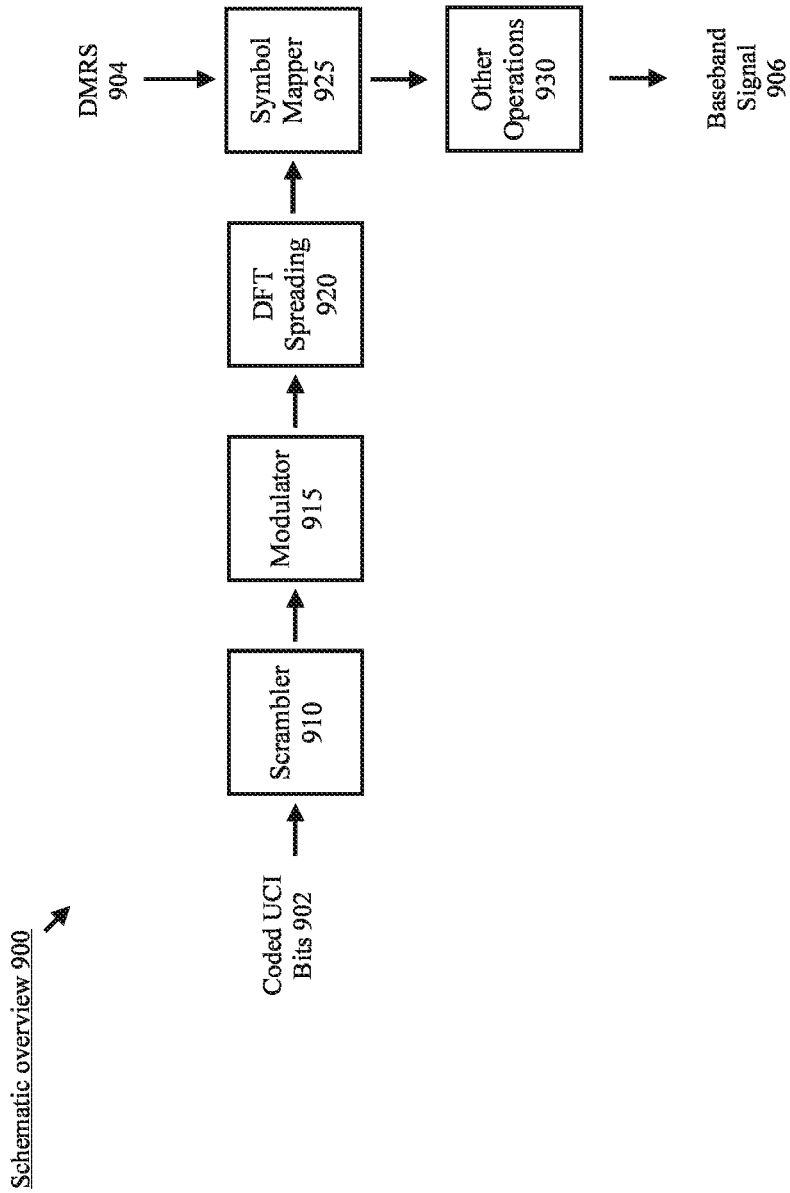
FIG. 9 shows a schematic overview of various baseband operations that may be performed to configure PUCCH format 3 with one or more PT-RS according to various exemplary embodiments.

FIG. 9 shows a schematic overview 900 of various baseband operations that may be performed to configure PUCCH format 3 with one or more PT-RS. The schematic overview 900 is provided as a general overview of some of the operations that may be performed by the UE 110 (e.g., processor 305) when configuring UCI to be transmitted in accordance with PUCCH format 3.

In the schematic overview 900, coded UCI bits 902 are input into a scrambler 910. The scrambler 910 may output scrambled UCI which is then provided to the modulator 915. The modulator 915 may be configured to perform QPSK modulation and/or pi/2-binary phase shift keying (BPSK) modulation on the coded UCI bits 902. In this example, since transform precoding is enabled, the coded UCI bits 902 are configured with DFT spreading 920 before the coded UCI bits 902 are provided to the symbol mapper 925.

In addition, the schematic overview 900 shows that DMRS 904 is also provided to the symbol mapper 925. The symbol mapper 925 may perform operations related to mapping UCI 902, PT-RS and/or DMRS 904 to the resources associated with the PUCCH. Those skilled in the art will understand that the output of the symbol mapper 925 may be subjected to other operations 930 before a baseband signal may be generated. The other operations 930 may include, but are not limited to, inverse fast Fourier transform (IFFT), CP insertion, gain and frequency adjustment, time domain windowing, etc. Subsequently, a baseband signal 906 is generated and ready to be transmitted.

Returning to the ASN.1 800 of FIG. 8, a sample density parameter may also be provided to the UE 110. The sample density parameter may indicate a number of PT-RS groups to be inserted into PUCCH format 3 and a number of sample (e.g., symbols) in each PT-RS group.

The sample density parameter may be utilized during baseband sequence generation when transform precoding is enabled to allow PT-RS symbol mapping for DFT spreading. To provide an example, a first PT-RS group may be configured to include two PT-RS tones and be located at a first location within the sample sequence and a second PT-RS group may be configured to include two PT-RS tones and be located at a second location within the sample sequence that is separated from the first PT-RS group by a certain number of OFDM symbols. In some embodiments, the first PR-RS group and the second PT-RS group may be located at the start and end of the sample sequence respectively. In other embodiments, the first PT-RS group may be located within a first quarter of the sample sequence and the second PT-RS group may be located within a third quarter of the sample sequence. To provide another example, there may be four PT-RS that each include two tones and are separated from one another by one or more OFDM symbols. However, any reference to a particular arrangement of PT-RS groups and samples per PT-RS group is merely provided for illustrative purposes. The exemplary embodiments may apply to any appropriate DFT spread configuration.

The configuration of the number of PT-RS groups and the number of samples per PT-RS group correlates to the PT-RS signaling overhead. However, phase tracking may benefit from having more PT-RS groups and samples per PT-RS groups. Accordingly, in some embodiments, these parameters may be configured to consider the trade-off between phase tracking and PT-RS overhead.

In another aspect, the exemplary embodiments include techniques for implementing PT-RS for PUCCH format 4. PUCCH format 4 may occupy four to fourteen symbols, carry more than two bits and span a single PRB. Exemplary techniques for implementing PT-RS for PUCCH format 4 will be described below with regard to FIGS. 10-11.

To implement PT-RS for PUCCH format 4, block wise spreading may be utilized to enable resource multiplexing among different UEs. For block wise spreading, under conventional circumstances, every complex symbol is information bearing. By fixing some complex symbols with modulation symbols, then known symbols may be inserted into PUCCH format 4 instead of the unknown (e.g., information bearing) symbols. The known complex symbols can be generated from a Gold sequence.

Figure 10:
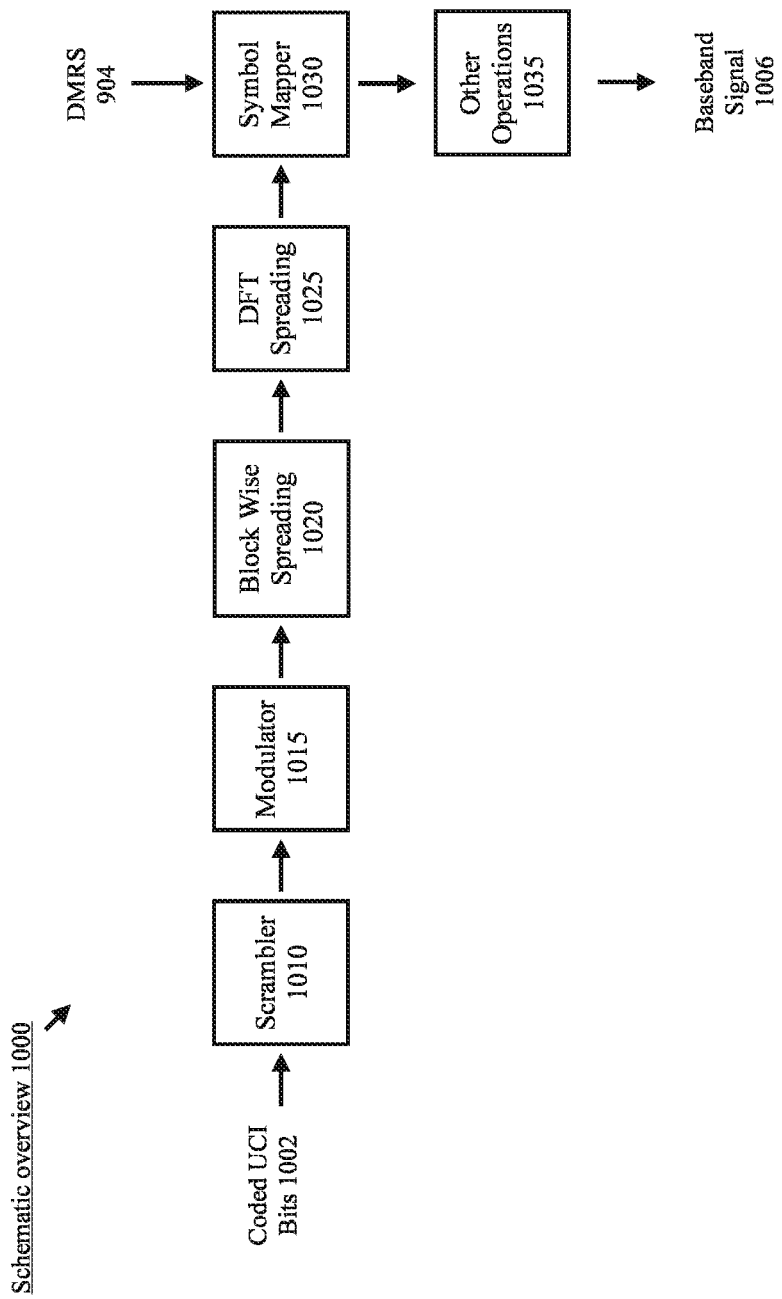
FIG. 10 shows a schematic overview of various baseband operations that may be performed to configure PUCCH format 4 with one or more PT-RS according to various exemplary embodiments.

FIG. 10 shows a schematic overview 1000 of various baseband operations that may be performed to configure PUCCH format 4 with one or more PT-RS. The schematic overview 1000 is provided as a general overview of some of the operations that may be performed by the UE 110 (e.g., processor 305) when configuring UCI to be transmitted in accordance with PUCCH format 4.

In the schematic overview 1000, coded UCI bits 1002 are input into a scrambler 1010. The scrambler 1010 may output scrambled UCI which is then provided to the modulator 1015. The modulator 1015 may be configured to perform QPSK modulation and/or pi/2-BPSK modulation on the coded UCI bits 1002.

The coded UCI bits 1002 may then be configured with block wise spreading 1020 and DFT spreading 1025 before the coded UCI bits 1002 are provided to the symbol mapper 1030.

In addition, the schematic overview 1000 shows that DMRS 1004 is also provided to the symbol mapper 1030. The symbol mapper 1030 may perform operations related to mapping UCI 1002, PT-RS and/or DMRS 1004 to the resources associated with the PUCCH. Those skilled in the art will understand that the output of the symbol mapper 1030 may be subjected to other operations 1035 before a baseband signal may be generated. The other operations 1035 may include, but are not limited to, inverse fast Fourier transform (IFFT), CP insertion, gain and frequency adjustment, time domain windowing, etc. Subsequently, a baseband signal 1006 is generated and ready to be transmitted.

Figure 11:
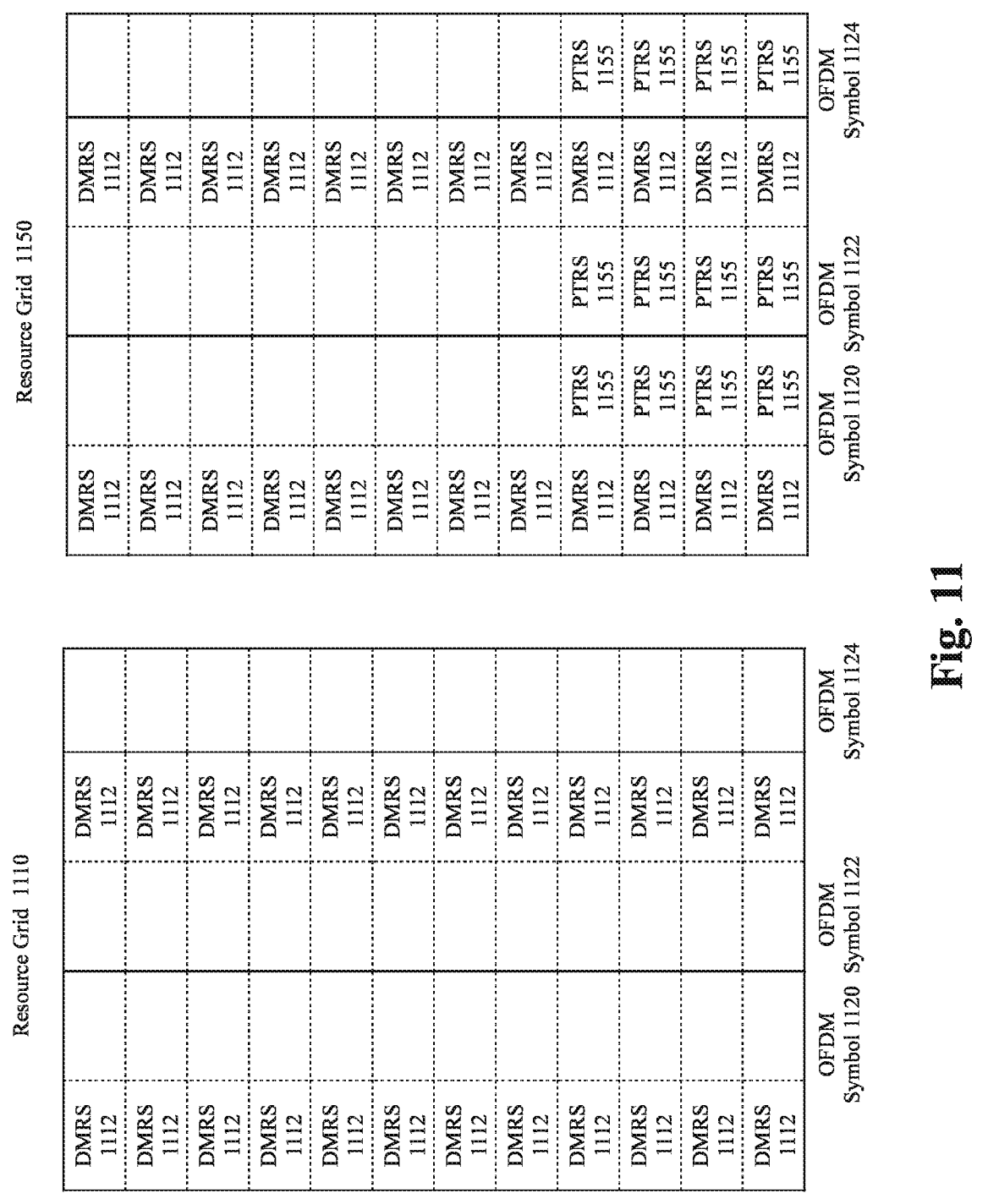

FIG. 11 shows an example of a resource grid 1150 that includes block wise spreading for PUCCH format 4. The resource grid 1110 shows an example of block wise spreading without PT-RS. In this example, the resource grid 1110 includes DMRS 1112 and illustrates a block spreading factor of four. Over each OFDM symbol 1120, 1122, 1124 that does not include DMRS 1112, three complex data symbols are spread into twelve modulation symbols. This creates 3×3 modulation symbols in the PUCCH. Within the context of the schematic overview 1000 provided in FIG. 10, the configuration shown in FIG. 11 occurs prior to DFT spreading.

The resource grid 1150 illustrates a scenario in which one of the complex data symbols is replaced with a PT-RS data symbol that has a known value. This creates 2×3 modulation symbols in the PUCCH. The PT-RS 1155 are shown to be included in each OFDM symbol 1120, 1122, 1124 that does not include DMRS 1112. Those skilled in the art will understand that the block wise spreading factor correlates to the PT-RS overhead. For example, by lowering the block spreading factor from four to two, the PT-RS can be reduced from one third of RBs to one sixth of the RBs. Thus, the number of PT-RS to be included in PUCCH format 4 may be based on the block wise spreading factor used during sequence generations.

The exemplary embodiments described above with regard to FIGS. 5-11 include techniques for implementing PT-RS for PUCCH format 2, PUCCH format 3 and PUCCH format 4. The following exemplary embodiments provide various other aspects of simultaneous PUCCH and PUSCH transmissions on different CCs.

The presence of PT-RS means that there are less resources available for other UCI transmissions. In some embodiments, the presence of PT-RS and/or the corresponding overhead may be based on any of a variety of different factors. To provide an example, the factors may include, but are not limited to, a UCI coding rate, a duration of PUCCH in number of OFDM symbols, a duration of a frequency hop of PUCCH in number of OFDM symbols, a number of PRBs taken by PUCCH, or any combination thereof. During operation, the UE 110 may be configured with rules and/or parameters to trigger the presence of PT-RS and/or control its corresponding overhead (e.g., decrease or increase the number of PT-RS). In some embodiments, the rules and/or parameters may be signaled by the gNB to the UE 110. This signal may or may not be preceded by a message from the UE 110 to the network indicating rules and/or parameters that the network may take into consideration when configuring the UE 110.

In some examples, when PUCCH is not expected to be negatively impacted from Phase discontinuity on every OFDM symbol, the locations of the PT-RS may be further limited. In one example, through gNB signaling restriction, a transmission of PUCCH or PUSCH may be configured to always start from an even-indexed OFDM symbol in a slot and the duration of such transmission is configured to be an even number of OFDM symbols. In addition, the OFDM symbols in a slot may be divided into symbol groups and thus, phase discontinuity may only take place at the boundary of the two symbol groups. Accordingly, PT-RS may be inserted to handle phase discontinuity at the boundary of two symbol groups. In a second example, the OFDM symbol groups may be configured with a different number OFDM symbols. For instance, a first symbol group may comprise symbols 0, 1, 2, 3, a second symbol group may comprise symbols 4, 5, 6, a third symbol groups comprises symbols, 7, 8, 9 and a fourth symbol group includes symbols 10, 11, 12, 13. In this example, if PUCCH has 14 OFDM symbols, then PT-RS may be inserted in symbols 0, 4, 7 and 10 if DMRS is not present on a respective OFDM symbol.

It has also been identified that it may be beneficial to implement double symbol DMRS to provide better channel estimation at the base station. Those skilled in the art will understand that the transmission duration of a PUSCH, or a PUSCH with slot aggregation or a PUSCH repetition type B may be relatively long. As a result, the phase discontinuity issues in this type of simultaneous transmission scenario may be more acute. To address this issue, a scheduling restriction may be implemented. For instance, with double symbol DRMS, the corresponding PUSCH transmission may start on even-indexed OFDM symbols (e.g., 0, 2, 4, 6, etc.). The base station may implement a scheduling restriction on PUCCH such that the duration of the PUCCH is an even number of OFDM symbols. This prevents the PUCCH from starting in the middle of the PUSCH transmission and thus, the phase discontinuity may be addressed for double symbol DMRS without the use of PT-RS.

In addition, PUCCH format 4 may be utilized in the portion of the spectrum beyond 52.6 GHz. Some of the exemplary techniques described above may be applicable to this scenario because block spreading is still used beyond 52.6 GHz and when multiple PRBs are used for PUCCH format 4, the overhead from the PT-RS overhead may be reduced. Thus, it may be beneficial to incorporate some of the exemplary techniques described herein to future implementation of PUCCH format 4 in the portion of the spectrum beyond 52.6 GHz.

The use of PT-RS for PUCCH and PUSCH, in addition to DMRS, may result in a higher code rate for the UCI and/or uplink data. In some embodiments, exemplary power prioritization rules for power allocation to different uplink transmissions may be implemented. For example, to keep phase continuity for the same priority index, a PUSCH starting earlier than a PUCCH may have a higher transmit power priority than the PUCCH overlapping with the PUSCH on either a primary cell (PCell) or a secondary cell (SCell). For PUCCH and PUSCH, the transmission that better aligns with the other channels may be prioritized.

Examples

In a first example, a user equipment (UE) comprising a transceiver configured to communicate with a base station and a processor communicatively coupled to the transceiver and configured to perform operations is provided. The operations include receiving configuration information associated with inserting phase tracking-reference signals (PT-RS) into a physical uplink control channel (PUCCH) signal, generating a first signal that is to be transmitted over the PUCCH and is configured to include one or more PT-RS and transmitting the first signal over the PUCCH.

In a second example, the UE of the first example, wherein the operations further comprise generating a second signal that is to be transmitted over the PUSCH and is configured to include one or more PT-RS, wherein the configuration information further comprises configuration information associated with inserting PT-RS into a physical uplink control (PUSCH) signal and transmitting the second signal over the PUSCH, wherein the PUCCH and PUSCH transmissions are performed simultaneously over different component carriers (CCs).

In a third example, the UE of the first example, wherein the configuration information corresponding to the PUCCH indicates whether transform precoding is to be utilized for generating the first signal.

In a fourth example, the UE of the first example, wherein generating the first signal includes determining a frequency density for PT-RS based on one or more thresholds and a physical resource block (PRB) parameter indicated in the configuration information.

In a fifth example, the UE of the first example, wherein generating the first signal includes determining a sample density for PT-RS based on a number of PT-RS groups and a number of samples per PT-RS group.

In a sixth example, the UE of the first example, wherein the first signal is generated based on PUCCH format 2.

In a seventh example, the UE of the sixth example, wherein the PUCCH format 2 occupies two orthogonal frequency division multiplexing (OFDM) symbols and wherein generating the first signal includes utilizing a separate gold sequence for each OFDM symbol.

In an eighth example, the UE of the sixth example, wherein the PUCCH format 2 is configured to include block PT-RS that is based on a number of blocks, a number of tones per block and an offset parameter relative to a PUCCH tone and a PUSCH tone included in a second signal transmitted over the PUSCH on a different component carrier (CC) than the PUCCH.

In a ninth example, the UE of the first example, wherein the PUCCH is configured to a first subcarrier spacing (SCS), a physical uplink shared channel (PUSCH) is configured with a second different SCS and the first signal is configured to include block PT-RS.

In a tenth example, the UE of the first example, wherein the first signal is generated based on PUCCH format 3.

In an eleventh example, the UE of the first example, wherein the first signal is generated based on PUCCH format 4.

In a twelfth example, the UE of the eleventh example, wherein generating the first signal includes utilizing block wise spreading to insert PT-RS into one or more orthogonal frequency division multiplexing (OFDM) symbols of the PUCCH format 4.

In a thirteenth example, the UE of the twelfth example, wherein the PT-RS overhead for the PUCCH format 4 is based on a block spreading factor.

In a fourteenth example, the UE of the first example, wherein configuring the first signal to include PT-RS is triggered based on one or more factors.

In a fifteenth example, the UE of the fourteenth example, wherein the one or more factors include one or more of a uplink control information (UCI) coding rate, a duration of the PUCCH, a duration of a frequency hop of PUCCH and a number of physical resource blocks (PRBs) utilized by the PUCCH.

In a sixteenth example, the UE of the first example, wherein the first signal is further configured to start on an even-indexed orthogonal frequency division multiplexing (OFDM) slot and have a transmission duration of an even number of OFDM symbols.

In a seventeenth example, the UE of the sixteenth example, wherein the OFDM symbols may be configured into multiple OFDM symbol groups and PT-RS is inserted at a boundary between a first OFDM symbol group and a second OFDM symbol group.

In a eighteenth example, the UE of the seventeenth example, wherein the first OFDM symbol group and the second OFDM symbol group include a different number of OFDM symbols.

In a nineteenth example, a base station comprising a transceiver configured to communicate with a user equipment (UE) and a processor communicatively coupled to the transceiver and configured to perform operations is provided. The operations include transmitting configuration information to a user equipment (UE), the configuration information associated with the UE inserting phase tracking reference signals (PT-RS) into a physical uplink control channel (PUCCH) signal, receiving a PUCCH signal from the UE, wherein the PUCCH uplink signal includes one or more PT-RS and performing phase tracking based on the one or more PT-RS.

In a twentieth example, the base station of the nineteenth example, the operations further comprising receiving a physical uplink shared channel (PUSCH) signal that includes one or more PT-RS, wherein the configuration information further comprises configuration information associated with the UE inserting PT-RS info the PUSCH signal.

In a twenty first example, the base station of the nineteenth example, wherein the configuration information corresponding indicates that transform precoding is to not be utilized by the UE for PUCCH format 2.

In a twenty second example, the base station of the nineteenth example, wherein the configuration information includes a physical resource block (PRB) parameter and indicates to the UE that a frequency density of PT-RS for PUCCH format 2 is to be based on i) one or more thresholds and ii) the PRB parameter.

In a twenty third example, the base station of the nineteenth example, wherein the configuration information indicates that transform precoding is to be utilized by the UE for PUCCH format 3.

In a twenty fourth example, the base station of the nineteenth example, wherein the configuration information corresponding to the PUCCH indicates that a sample density of PT-RS for PUCCH format 3 is to be based on a number of PT-RS groups and a number of samples per PT-RS group.

In a twenty fifth example, wherein the PUCCH signal is a PUCCH format 4 signal configured with block wise spreading.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
receiving configuration information associated with inserting phase tracking-reference signals (PT-RS) into a physical uplink control channel (PUCCH) signal;
generating a first signal that is to be transmitted over the PUCCH and is configured to include one or more PT-RS;
transmitting the first signal over the PUCCH;
generating a second signal that is to be transmitted over a physical uplink shared channel PUSCH) and is configured to include one or more PT-RS, wherein the configuration information further comprises configuration information associated with inserting PT-RS into the PUSCH signal; and
transmitting the second signal over the PUSCH, wherein the PUCCH and PUSCH transmissions are performed simultaneously over different component carriers (CCs).

2. The processor of claim 1, wherein the configuration information corresponding to the PUCCH indicates whether transform precoding is to be utilized for generating the first signal.

3. The processor of claim 1, wherein generating the first signal includes determining a frequency density for PT-RS based on one or more thresholds and a physical resource block (PRB) parameter indicated in the configuration information.

4. The processor of claim 1, wherein generating the first signal includes determining a sample density for PT-RS based on a number of PT-RS groups and a number of samples per PT-RS group.

5. The processor of claim 1, wherein the first signal is generated based on PUCCH format 2, wherein the PUCCH format 2 occupies two orthogonal frequency division multiplexing (OFDM) symbols and wherein generating the first signal includes utilizing a separate gold sequence for each OFDM symbol.

6. The processor of claim 1, wherein the first signal is generated based on PUCCH format 2, wherein the PUCCH format 2 is configured to include block PT-RS that is based on a number of blocks, a number of tones per block and an offset parameter relative to a PUCCH tone and a PUSCH tone included in the second signal transmitted over the PUSCH on a different component carrier (CC) than the PUCCH.

7. The processor of claim 1, wherein the PUCCH is configured to a first subcarrier spacing (SCS), the PUSCH is configured with a second different SCS and the first signal is configured to include block PT-RS.

8. The processor of claim 1, wherein the first signal is generated based on PUCCH format 3 or PUCCH format 4.

9. The processor of claim 8, wherein, when first signal is generated based on PUCCH format 4, generating the first signal includes utilizing block wise spreading to insert PT-RS into one or more orthogonal frequency division multiplexing (OFDM) symbols of the PUCCH format 4.

10. The processor of claim 1, wherein configuring the first signal to include PT-RS is triggered based on one or more factors comprising one or more of a uplink control information (UCI) coding rate, a duration of the PUCCH, a duration of a frequency hop of PUCCH and a number of physical resource blocks (PRBs) utilized by the PUCCH.

11. The processor of claim 1, wherein the first signal is further configured to start on an even-indexed orthogonal frequency division multiplexing (OFDM) slot and have a transmission duration of an even number of OFDM symbols.

12. The processor of claim 11, wherein the OFDM symbols are configured into multiple OFDM symbol groups and PT-RS is inserted at a boundary between a first OFDM symbol group and a second OFDM symbol group.

13. A processor of a base station configured to perform operations, comprising:
transmitting configuration information to a user equipment (UE), the configuration information associated with the UE inserting phase tracking reference signals (PT-RS) into a physical uplink control channel (PUCCH) signal;
receiving a PUCCH signal from the UE, wherein the PUCCH uplink signal includes one or more PT-RS;

receiving a physical uplink shared channel (PUSCH) signal that includes one or more PT-RS, wherein the configuration information further comprises configuration information associated with the UE inserting PT-RS info the PUSCH signal; and performing phase tracking based on the one or more PT-RS.

14. The processor of claim 13, wherein the configuration information corresponding indicates that transform precoding is to not be utilized by the UE for PUCCH format 2.

15. The processor of claim 13, wherein the configuration information includes a physical resource block (PRB) parameter and indicates to the UE that a frequency density of PT-RS for PUCCH format 2 is to be based on i) one or more thresholds and ii) the PRB parameter.

16. The processor of claim 13, wherein the configuration information indicates that transform precoding is to be utilized by the UE for PUCCH format 3.

17. The processor of claim 13, wherein the configuration information corresponding to the PUCCH indicates that a sample density of PT-RS for PUCCH format 3 is to be based on a number of PT-RS groups and a number of samples per PT-RS group.

18. The processor of claim 13, wherein the PUCCH signal is a PUCCH format 4 signal configured with block wise spreading.

19. A user equipment (UE), comprising:
a transceiver configured to communicate with a base station; and
a processor communicatively coupled to the transceiver and configured to perform operations comprising:
receiving configuration information associated with inserting phase tracking-reference signals (PT-RS) into a physical uplink control channel (PUCCH) signal;
generating a first signal that is to be transmitted over the PUCCH and is configured to include one or more PT-RS;
transmitting the first signal over the PUCCH;
generating a second signal that is to be transmitted over the PUSCH and is configured to include one or more PT-RS, wherein the configuration information further comprises configuration information associated with inserting PT-RS into a physical uplink control (PUSCH) signal; and
transmitting the second signal over the PUSCH, wherein the PUCCH and PUSCH transmissions are performed simultaneously over different component carriers (CCs).

20. The UE of claim 19, wherein the configuration information corresponding to the PUCCH indicates whether transform precoding is to be utilized for generating the first signal.

* * * * *